United States Patent [19]

Lievremont et al.

[11] 4,000,096

[45] Dec. 28, 1976

[54] MEASURING AND MIXING PROCESS FOR THE MANUFACTURE OF FOAMED RESINS AND INSTALLATION AND CONGLOMERATES OBTAINED BY USING THEM

[76] Inventors: Henri Lievremont, 103 rue Lamarck; Adolphe Cominassi, 95 Avenue Mozart, both of 75 Paris 16eme, France

[22] Filed: July 31, 1974

[21] Appl. No.: 493,401

Related U.S. Application Data

[63] Continuation of Ser. No. 282,756, Aug. 22, 9172, abandoned.

[30] Foreign Application Priority Data

Aug. 25, 1971 France .......................... 71.30756

[52] U.S. Cl. ...................... 260/2.5 F; 23/288 E; 260/2.5 R; 260/2.5 E; 260/2.5 BC
[51] Int. Cl.² .......................................... C08J 9/00
[58] Field of Search ........... 260/2.5 R, 2.5 F, 2.5 E, 260/2.5 BC; 23/288 E

[56] References Cited

UNITED STATES PATENTS

| | | | |
|---|---|---|---|
| 2,653,139 | 9/1953 | Sterling | 260/2.5 F |
| 2,915,299 | 12/1959 | Woebcke | 259/8 |
| 3,008,808 | 11/1961 | Hodges | 23/285 |
| 3,107,034 | 10/1963 | Dunnous | 222/70 |
| 3,123,342 | 3/1964 | Little | 259/23 |
| 3,300,419 | 1/1967 | Erickson | 260/2.5 F |
| 3,336,243 | 8/1967 | Garrett | 260/2.5 F |
| 3,753,554 | 8/1973 | Muller et al. | 259/8 |
| 3,779,959 | 12/1973 | Pinten et al. | 260/2.5 F |

*Primary Examiner*—Richard B. Turer
*Attorney, Agent, or Firm*—Thomas M. Meshbesher

[57] ABSTRACT

This invention concerns an improved measuring and mixing process and installation, in which the products are circulated by a system operating as a hydropneumatic convertor, and a batcher consisting of a cylinder containing a mobile piston is placed between this circulating system and the mixing tank.

It concerns in particular the measuring and mixing of products of widely different viscosities and densities.

4 Claims, 1 Drawing Figure

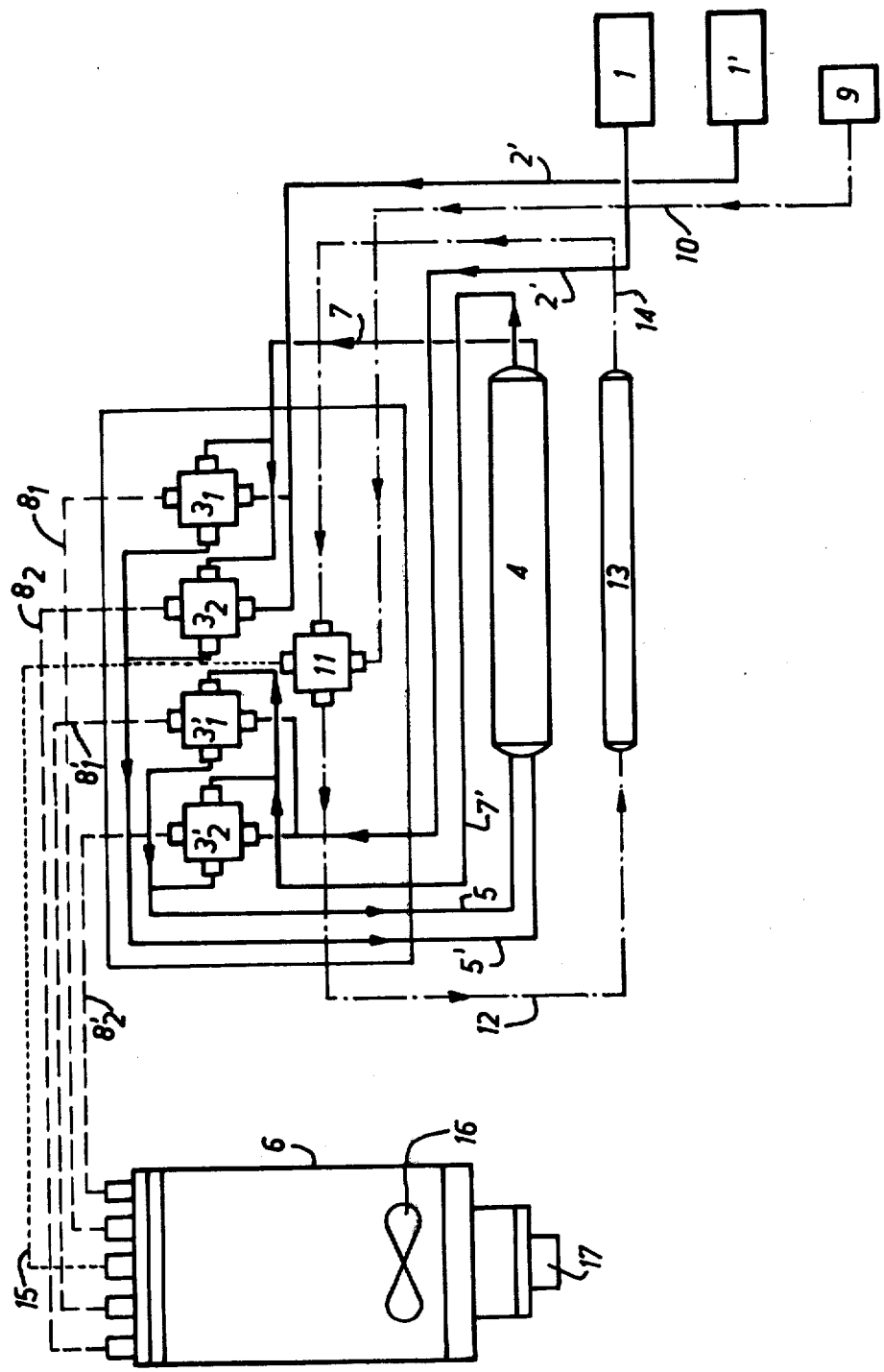

MEASURING AND MIXING PROCESS FOR THE MANUFACTURE OF FOAMED RESINS AND INSTALLATION AND CONGLOMERATES OBTAINED BY USING THEM

This application is a continuation of our co-pending application Ser. No. 282,756, filed Aug. 22, 1972, now abandoned.

This invention concerns an improved measuring and mixing process and installation, particularly for products of widely different viscosities and densities.

Pumps already exist to circulate products of widely different viscosities, but for products with very high viscosities and densities, the circulating pressure varies considerably, and consequently its flow-rate, so that the products to be mixed together cannot be measured correctly.

If the products being prepared are to retain their characteristics throughout, as is generally the case when synthesizing organic or inorganic substances, existing pumps are unsatisfactory.

This invention offers a way of overcoming the drawbacks of existing processes and installations.

The invention concerns a process for measuring and mixing products, particularly those with widely different viscosities and densities, in which measurement is done at constant pressure and volume, possibly different, the products are circulated by means of a system operating as a hydropneumatic convertor, and mixing is done by any existing means.

In one embodiment of the invention, the system operating as a hydropneumatic convertor exerts a thrust, the pressure of which can be adjusted as desired, by regulating the low pneumatic pressure.

The invention concerns an installation for measuring and mixing products, particularly with widely different viscosities and densities, in which the products are circulated by means of a system operating as a hydropneumatic convertor, and a batcher (i.e., batch metering device) consisting essentially of a cylinder containing a mobile piston is placed between this circulating system and the mixing tank.

In one embodiment of the invention, the batcher consists of a cylinder with a floating piston and a fixed piston, adjustable for instance by a micrometric screw.

In another embodiment, the circulating system consists of a cylindrical pump, the forcing pressure of which can be adjusted by regulating the low pneumatic pressure.

In another embodiment, the temperature of the products is kept constant, and is regulated by means of pyrometric probes on the batcher and injection-forcing head, connected to reading devices.

In another embodiment, these devices regulate the temperature by means of impulses.

This invention particularly concerns an installation in which high-pressure pneumatic pumps inject a granulated plastic, dispatched by a distributor device to a cylindrical batcher, and then to a tank where it is mixed with a catalyst, injected simultaneously by another pump, and conveyed by a suitable distributor device to another batcher and then to the mixing tank.

In one embodiment of the installation, the temperature of the ingredients being conveyed can be altered during their conveyance by means of heat-regulated rings, or cooling pipes, on the batchers or injection head, inside which a cooling fluid circulates.

The distributor device dispatches the raw material to the batchers and, at the batcher outlet, to the mixing tank; there are two such devices, so that the batcher and mixing tank can be fed simultaneously. That is, while the batcher is being fed with a new batch of raw material, causing movement of the mobile piston, the previously metered batch (on the other side of the mobile piston) is being fed to the mixing tank by this same piston movement.

This installation is particularly suitable for the preparation of a new industrial product consisting of a conglomerate, bound by a polycondensable resin such as a phenol-formol resin, of one or more substances or fillers such as $TiO_2$, mica, asbestos, and synthetic or inorganic fibers, such as organic resins, polyamide or glass fiber.

The conglomerate as defined in the invention is obtained by mixing one or more of these substances or fillers, in a resin such as a phenol-formol resin and at a temperature of between 20° and 80° C., and preferably at about 50° C., after one or more agents such as porophores and sodium bicarbonate have been added, by polycondensation caused by adding 8 to 10% weight of catalyst in relation to the weight of resin.

The catalyst used for polycondensation may consist of one or more acids belonging to the group made up of $ClH$, $SO_4H_2$, $PO_4H_3$, benzene sulphonic acid, etc.

In one embodiment, the conglomerate contains between 40 and 80% of these fillers, and preferably between 55 and 75%.

The speed of mixing varies, depending on the mixer, from 1,500 rpm at the start to 750 rpm as viscosity drops with the addition of acid.

The product obtained is extremely useful as a heat and sound insulating material, and it is flame-resistant, being able to withstand temperatures of 3,000° C. or more without ever catching fire or producing smoke or toxic vapors.

Other aims and advantages of the invention will appear from the following description, with the accompanying FIGURE. The invention is in no way confined to the embodiment shown here.

Turning now to the embodiment of the invention illustrated in the Drawing (which is a schematic representation of a typical apparatus of this invention), there are two high-pressure hydropneumatic pumps 1 and 1' provided with an electro-valve (not shown) to control the air intake at a pressure of one bar. A high-pressure intake barrel of each pump 1 and 1' is submerged in a tank (not shown), containing the raw material. A high-pressure outlet of each pump 1 and 1' is connected by pipes or conduits 2 and 2', controlled by pressure-detectors (not shown), to distributor devices $3_1$, $3_2$, $3'_1$, and $3'_2$, which dispatch the ingredients toward the batcher 4, along pipes or conduits 5 and 5', and then towards the mixing tank 6, along other pipes or conduits (7 and 7' and then $8_1$, $8_2$, $8'_1$ or $8'_2$).

As pointed out previously, batcher 4 contains a mobile piston (not shown), i.e. a piston arranged essentially normal to the axis of cylindrical batcher 4 such that it is capable of floating (reciprocal axial free movement) from one end of batcher 4 to the other end. Alternatively, as mentioned previously, the extent of the floating movement can be made adjustable, e.g. by means of a micrometric screw.

The system for metering batches of catalyst to mixing tank 6 is similar to the previously described batch metering system and comprises a pump 9, a pipe or conduit 10, a distributor device 11, and a further pipe or conduit 12 connected to one end of another batch metering device 13. The pipe or conduit 14 connected to the opposite end of the batcher or batch metering device 13 communicates with distributor device 11, so that device 11 can dispatch catalyst to mixing tank 6 through pipe or conduit 15.

There is a stirring device in the mixing tank, such as a turbine 16, driven by a motor (not shown here).

The mixed products are discharged through an extrusion head 17, by opening a tap (not shown here), which acts in liaison with the order of selection of the distributor devices ($3_1$ or $3_2$, and $3'_1$ or $3'_2$). When one pair of these devices (e.g. $3_1$ and $3'_1$) dispatches raw material to the batcher 4, the other (e.g. $3_2$ and $3'_2$) dispatches it to the tank 6.

Selection of these devices is controlled by a pressure detector (not shown here), which detects the pressure in the batcher. When the batcher is full, this detector selects the appropriate distributor devices, so that fresh material is fed to the batcher and the preceding batch is dispatched toward the mixing tank. Naturally, these is a batcher for each ingredient; the pumps in this FIGURE 1 and 1' are for the situation in which the flow rate is too great for a single pump.

The following is a typical illustration of this mode of operation.

Raw material is pumped from pumps 1 and/or 1' to a first pair of distributor devices, in this case (as indicated by the arrows in the drawing) devices $3_1$ and $3'_1$. The flow of raw material through conduits 5 and 5' into a first end of batcher 4 causes the mobile piston to advance toward the opposite end, i.e. the end communicating with conduit 7 and 7'. The movement of the mobile or floating piston in response to the influx of raw material from distributor devices $3_1$ and $3'_1$ and conduits 5 and 5' serves two purposes. First, the movement of the piston exerts a force on the batch of raw material previously dispatched to batcher 4 through conduits 7 and 7', the volume of this batch being defined by the surface of the mobile piston facing toward conduits 7 and 7'. Thus, a pre-measured batch of raw material is dispatched from batcher 4 through conduits 7 and 7' and distributor devices $3_2$ and $3'_2$ through conduits $8_2$ and $8'_2$ to mixing tank 6, due to this movement of the mobile piston along the axis of batcher 4 toward conduits 7 and 7'.

Second, the movement of the mobile piston ultimately reaches a limit (the opposite end of batcher 4 or some other predetermined position), thereby defining a new batch of material which can be exhausted through conduits 5 and 5' (against the arrows shown in the drawing) when the piston moves in response to feeding of raw material to batcher 4 through conduits 7 and 7' (again, this flow would be opposite to the arrows shown in the drawing).

The operation of batcher 13 is analogous to that of batcher 4. Furthermore, batcher 13 can be operated simultaneously with batcher 4, so that the catalyst, preferably consisting of 8% by weight of one-third Normal $H_3PO_4$ is simultaneously injected by the pump 9 through conduit 10 to distributor device 11, conduit 12, batcher 13, and conduits 14 and 15. The various substances needed for conglomerate products produced by this invention can thereby be fed simultaneously into the mixing tank for mixing and chemical reactions or the like followed by extrusion, which usually is carried out at a temperature of about 45° C. The ingredients fed to the mixing tank preferably include a gas-generating substance (e.g. a nitrogen-generating or carbon dioxide-generating substance) which causes limited expansion of the extruded product. The preferred nitrogen-generating or carbon dioxide-generating substances are $NaHCO_3$ or "porophores". ("Porofor" is a registered trademark, now a generic name in France for nitrogen-generating azocarbonnamides, hydrazides, and nitriles.)

The temperature of the products being conveyed through the installation can be changed, by means of high-precision heat-regulated rings, or pipes on the batchers or injection head with cooling fluid circulating inside them.

The temperature of the batchers is preferably regulated by external circulation of fluid.

The temperature of the products is preferably kept constant, being regulated by means of pyrometric probes on the batcher and injection head, linked to reading devices which regulate temperature by emitting impulses.

Dispersal of all the ingredients is carried out in the mixing tank, and expansion begins as soon as the catalyst is injected into the mixture, continuing as it is dispersed; the reaction is isothermal, with extra heat contributed by the heating system, regulated by pyrometers on the mixing tank.

The installation as shown here is particularly suitable for the preparation of a new industrial product consisting of a conglomerate, bound by a polycondensable resin such as a phenol-formol resin, of one or more substances or fillers such as $TiO_2$, mica, asbestos, and synthetic or inorganic fibers, such as organic resins, polyamide or glass fiber.

The conglomerate as defined in this invention can be obtained as follows.

Approximately 50 parts phenol-aldehyde resin (e.g. phenol-formol), 10 parts $TiO_2$, 20 parts mica, some in perlite form and the rest in powder form, 15 parts asbestos in fine fiber and powder form, and 5 parts magnesium silicate or $CaCO_3$ were fed into the mixing tank, and 3.5 parts ⅓ N phosphoric acid and approximately 2 parts "Porophores" (or $NaHCO_3$) were added. The temperature of the batcher and mixing was kept at 45° C.

The inlet flow-rate was 50 to 100 kg per minute, and the extrusion rate was 200 to 500 liters per hour, expanded at 485 bars.

The conglomerate obtained had the density between 180 and 200 g per liter, and excellent mechanical strength, particularly abrasive strength.

Its flameproof properties were such that it would not catch fire even when exposed to flames at 3,000° C. Heat conductivity was measured on a sample 25 cm thick, and a factor of $K_{25} < 0.8$ was found.

The product also appeared to be completely rotproof and impermeable.

Preferred conglomerate products obtained by the process of this invention comprise a polycondensate resin such as phenol-formol (i.e. phenol-formaldehyde), or some other suitable binder, which binds together at least one substance of filler such as titanium dioxide, mica, asbestos, and synthetic or inorganic fibers, e.g. polyamide or glass fibers. The conglomerate can be obtained by mixing at least one of these substances or fillers in the resin binder at a temperature between 20° and 80° C. (e.g. 50° C), after at least one gas-generating agent such as "Porophores" or sodium bicarbonate has been added. Polycondensation of the resin binder can be initiated by adding 8 to 10% by weight of catalyst in relation to the weight of the resin. Preferred catalysts comprise strong mineral acids or organic acids such as HCl, $H_2SO_4$, $H_3PO_4$, and the aromatic sulfonic acids. The preferred range of filler content is 40 to 80% by weight (e.g. 55 – 75% by weight).

The invention is in no way confined to the embodiments described here: many alternative versions are possible for someone skilled in the art, without any departure from the spirit of the invention.

What is claimed is:

1. A process for making an extruded, foamed, flame-resistant heat and sound insulating material containing a phenolic resin binder and a filler material, comprising the steps of:
    a. pumping under pressure a first ingredient consisting of: said phenolic resin in a fluid state, said filler material which filler material includes fibrous and powdered fillers, and a foaming agent, into a first compartment of a first cylinder-like batcher, which first compartment of said first batcher is separated from a second compartment of said first batcher by a floating piston;
    b. pumping under pressure substantially at the same time a second ingredient comprising a polycondensation catalyst for said phenolic resin into a first compartment of a second cylinder-like batcher, which first compartment of said second batcher is separated from a second compartment of said second batcher by a floating piston;
    c. subsequent to steps (a) and (b) pumping under pressure said first ingredient into said second compartment of said first batcher while simultaneously providing liquid communication between said first compartment and a mixing zone, to expel, by means of said pumping of said first ingredient into said second compartment, the ingredient from said first compartment of the first batcher, thereby introducing the expelled first ingredient from said first compartment into said mixing zone;
    d. substantially simultaneously with said step (c), pumping under pressure said second ingredient into said second compartment of said second batcher while simultaneously providing liquid communication between said first compartment of said second batcher and said mixing zone, to expel, by means of said pumping of said second ingredient into said second compartment, the ingredient from said first compartment of the second batcher, thereby introducing the expelled ingredient into said mixing zone; whereby the inlet flow of said ingredients to said mixing zone is 50 to 100 kilograms per hour;
    e. mixing the thus introduced ingredients in said mixing zone; and
    f. extruding the resulting mixture by forcing said mixture from said mixing zone through an extrusion die.

2. The process of claim 1, wherein said phenolic resin is a phenol-formaldehyde resin.

3. The process of claim 1, wherein the mixture extruded from said extrusion die is a foamed flame-resistant heat and sound insulating material having a density of 180 to 200 grams per cubic decimeter.

4. A conglomerate product, comprising at least one filler bound together with a polycondensate resin binder, said product being made by the process of claim 1.

* * * * *